United States Patent
Houle

(10) Patent No.: US 9,480,346 B2
(45) Date of Patent: Nov. 1, 2016

(54) LIGHTING SUPPORT FOR MOUNTING A LIGHT SOURCE ONTO A SHELF

(71) Applicant: Pascal-Simon Houle, Quebec (CA)

(72) Inventor: Pascal-Simon Houle, Quebec (CA)

( * ) Notice: Subject to any disclaimer, the term of this patent is extended or adjusted under 35 U.S.C. 154(b) by 66 days.

(21) Appl. No.: 14/501,992

(22) Filed: Sep. 30, 2014

(65) Prior Publication Data

US 2016/0091177 A1   Mar. 31, 2016

Related U.S. Application Data

(60) Provisional application No. 62/057,071, filed on Sep. 29, 2014.

(51) Int. Cl.

| | |
|---|---|
| *A47F 5/00* | (2006.01) |
| *A47F 3/00* | (2006.01) |
| *F16M 13/02* | (2006.01) |
| *F21V 21/088* | (2006.01) |
| *F21V 33/00* | (2006.01) |
| *F21W 131/301* | (2006.01) |
| *F21Y 103/00* | (2016.01) |
| *F21W 131/405* | (2006.01) |
| *F21Y 101/02* | (2006.01) |
| *A47F 11/10* | (2006.01) |

(52) U.S. Cl.
CPC ............ *A47F 3/001* (2013.01); *A47F 5/0068* (2013.01); *F16M 13/02* (2013.01); *F21V 21/088* (2013.01); *A47F 11/10* (2013.01); *F21S 4/28* (2016.01); *F21V 33/0012* (2013.01); *F21W 2131/301* (2013.01); *F21W 2131/405* (2013.01); *F21Y 2101/02* (2013.01); *F21Y 2103/003* (2013.01)

(58) Field of Classification Search
CPC ...... F21V 19/00; F21V 33/0012; F21S 8/00; F16M 13/02; A47F 3/001; F21W 2131/301; G09F 3/204; Y10T 24/1498; Y10T 24/44752
See application file for complete search history.

(56) References Cited

U.S. PATENT DOCUMENTS

| | | | |
|---|---|---|---|
| 8,215,795 B2 | 7/2012 | Pichel | |
| 2010/0001660 A1* | 1/2010 | Pas | A47F 3/001 315/292 |

(Continued)

FOREIGN PATENT DOCUMENTS

EP   2777442   9/2014

OTHER PUBLICATIONS

Luxx Lichttechnik, "Led Shelf Tag," Innovative Shelf lighting, 2014, http://www.luxx.com/LED-SHELF-TAG-Innovative-shelve-light; 1 page.
Hillphoenix, Clearvoyant LED System 2, 2012, 4 pages.
Philips, "The Right Fit-Philips InteGrade LED Engine System-compact linear LED lighting for maximum freedom of design," 2013, 6 pages.

(Continued)

*Primary Examiner* — Anh Mai
*Assistant Examiner* — Fatima Farokhrooz
(74) *Attorney, Agent, or Firm* — Price Heneveld LLP

(57) ABSTRACT

A lighting support for mounting a light source onto shelving including a lower shelf and an upper shelf, the upper shelf having a front end and a front edge structure. The lighting support comprises a securing member operatively connectable to the front edge structure of the upper shelf a light source support connected to the securing member. The light source support is configured to receive and support the light source and is positioned for the light source to illuminate a section of the lower shelf when the securing member is operatively connected to the front edge structure of the upper shelf.

34 Claims, 5 Drawing Sheets

(56) References Cited

U.S. PATENT DOCUMENTS

2014/0153279 A1* 6/2014 Weyer .................. A47F 5/0869
362/604
2014/0254136 A1 9/2014 Oraw et al.

OTHER PUBLICATIONS

Philips, "The Perfect Fit-Philips InteGrade LED Fixture System-compact linear LED lighting for standard-size shelves," 2013. 6 pages.

* cited by examiner

LIGHTING SUPPORT FOR MOUNTING A LIGHT SOURCE ONTO A SHELF

CROSS-REFERENCE TO RELATED APPLICATION

This application claims the benefit of U.S. Provisional Application No. 62/057,071 filed on Sep. 29, 2014, entitled LIGHTING SUPPORT FOR MOUNTING A LIGHT SOURCE ONTO A SHELF, the entire contents of which are incorporated herein by reference.

FIELD OF THE INVENTION

The present invention relates to the field of illumination for displays. More particularly, it relates to a lighting support for a light source for a shelf.

BACKGROUND OF THE INVENTION

It is well known in the art that, in the context of a retail environment, illumination of products on display has an impact on sales and the overall customer experience. More particularly, it is known that proper illumination of products on display has a positive effect on sales of the particular products.

In view of the above, fluorescent tubes are commonly used to illuminate an interior space of shelving. For example, in order to properly illuminate products or items disposed on a shelf, it is known to provide shelf lighting, i.e. a lighting configuration designed to illuminate a section of shelf containing a plurality of products or items on display and which extends between a front end and a back end of the shelf. Typically, a fluorescent tube is mounted above the shelf to be illuminated and is positioned to illuminate the entire section of the shelf where the products or items are located. For aesthetic considerations, the fluorescent tubes are therefore commonly hidden under each shelf, in order to illuminate the products on the shelf below.

Particularly of concern is the positioning of the fluorescent tubes which is typically unfavourable. Indeed, in order to provide lighting of the entire section of the shelf where the products or items are located, between the front end and the back end of the shelf, the fluorescent tubes are commonly positioned rearward of the front end of the above shelf and recessed from the front end of the above shelf. Such a positioning thereby negatively impacts both the illumination of the merchandise as it does not allow optimal illumination of the face of the product at the front of the shelf. Moreover, such a positioning also negatively impacts the access to products or items by the customers and/or the retrieval of the products from the shelf.

In view of the above, there is a need for an improved manner of providing a light source onto shelving, which, by virtue of its design and components, would be able to overcome or at least minimize some of the above-discussed prior art concerns.

SUMMARY OF THE INVENTION

According to a general aspect, there is provided a lighting support for mounting a light source onto shelving including a lower shelf and an upper shelf, the upper shelf having a front end and a front edge structure. The lighting support comprises a securing member operatively connectable to the front edge structure of the upper shelf and a light source support connected to the securing member. The light source support is configured to receive and support the light source and is positioned for the light source to illuminate a section of the lower shelf when the securing member is operatively connected to the front edge structure of the upper shelf.

In an embodiment, the light source support projects at least partially forward of the front end of the upper shelf.

In an embodiment, the light source support projects from the securing member.

In an embodiment, the light source support is integral to the securing member.

In an embodiment, the lighting support further comprises a shelf signage bracket connected to the securing member by a bridge and the light source support projects from the shelf signage bracket.

In an embodiment, the light source support is integral to the shelf signage bracket.

In an embodiment, the light source support is rearwardly angled with regards to the front end of the upper shelf.

In an embodiment, a rearward angle of the light source support ranges between about 1° and about 45°.

In an embodiment, the front edge structure comprises a flange projecting from a front end of the upper shelf and the securing member is shaped as a clip defining a flange receiving cavity receiving at least a portion of the flange therein when the securing member is operatively connected to the front edge structure of the upper shelf.

In an embodiment, the light source support is proximate to a lower end of the front edge structure of the upper shelf, when the securing member is operatively connected to the front edge structure of the upper shelf.

In an embodiment, the light source support comprises an elongated light source receiving cavity to receive an elongated light source therein.

In an embodiment, the light source support extends along a lower end of the lighting support.

In an embodiment, the lighting support is in combination with a light source, and the light source is an elongated light source including a plurality of successive slim profile LEDs mounted to a printed circuit board.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIG. 3A is a close-up view of a section of the support for a light source shown and mounted to the shelf shown in FIG. 3;

DETAILED DESCRIPTION

Figure 1:
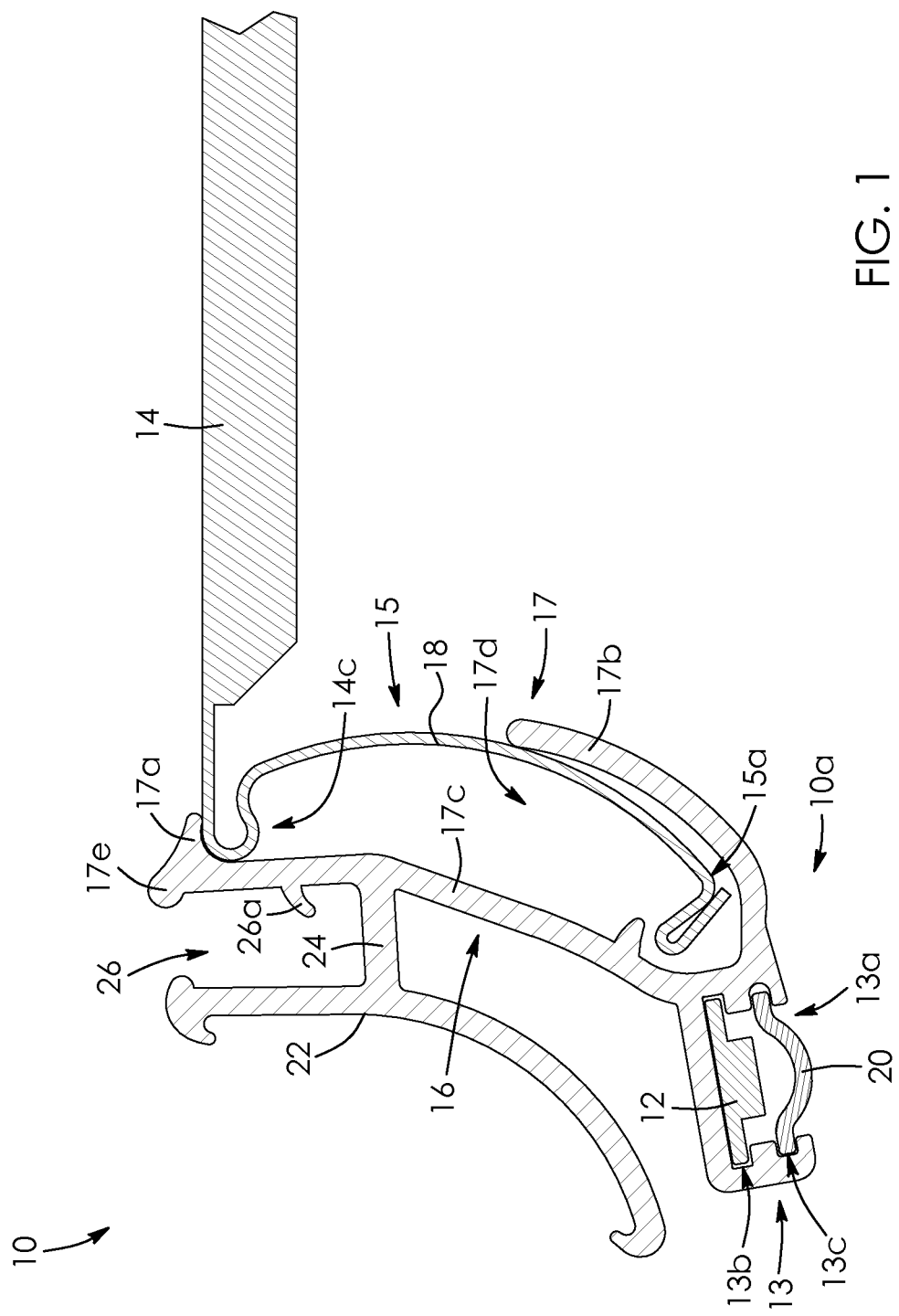
FIG. 1 is a cross-sectional side view of a support for a light source according to an embodiment and shown mounted to a shelf.
Figure 2:
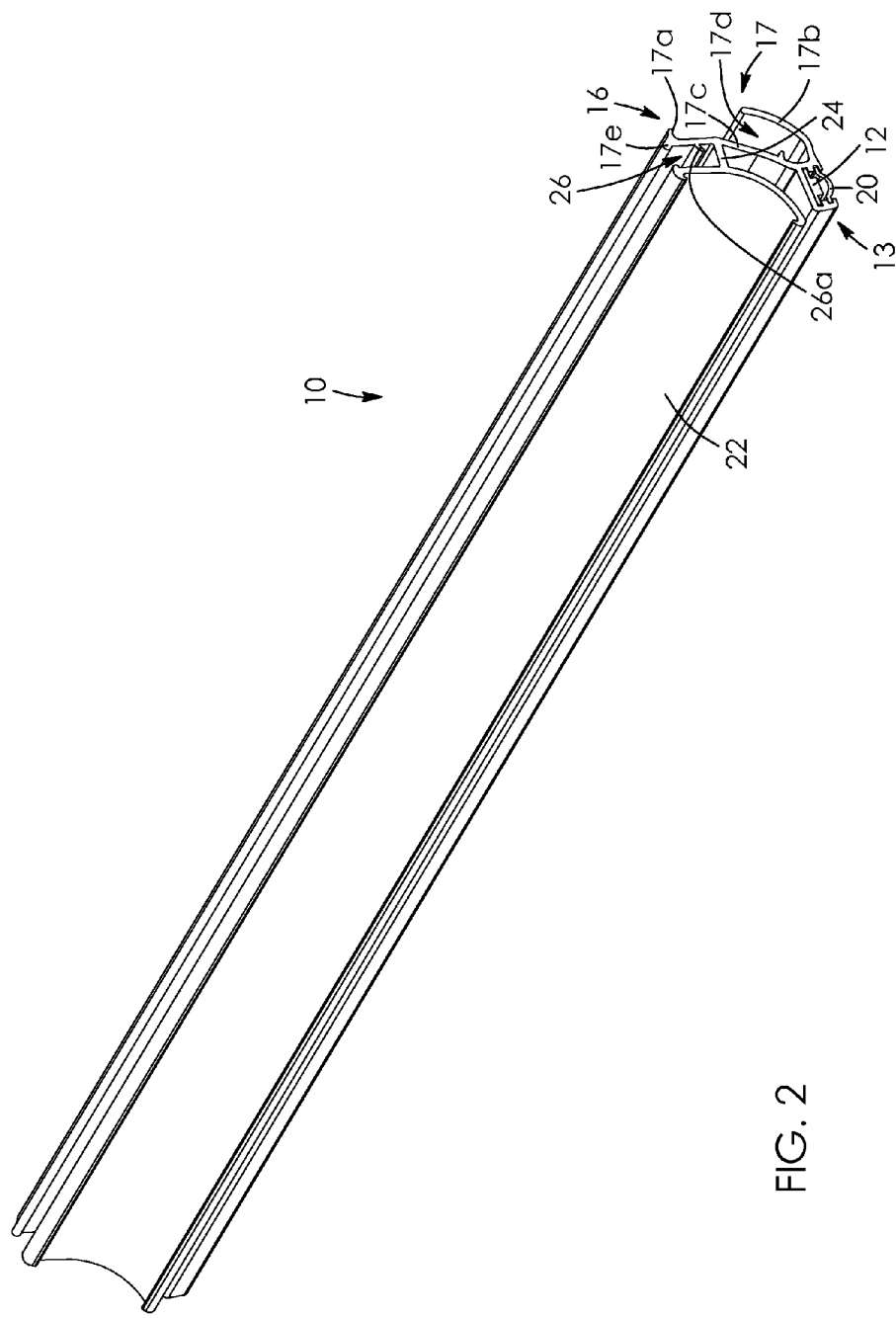
FIG. 2 is a perspective view of the support for a light source of FIG. 1.
Figure 3:
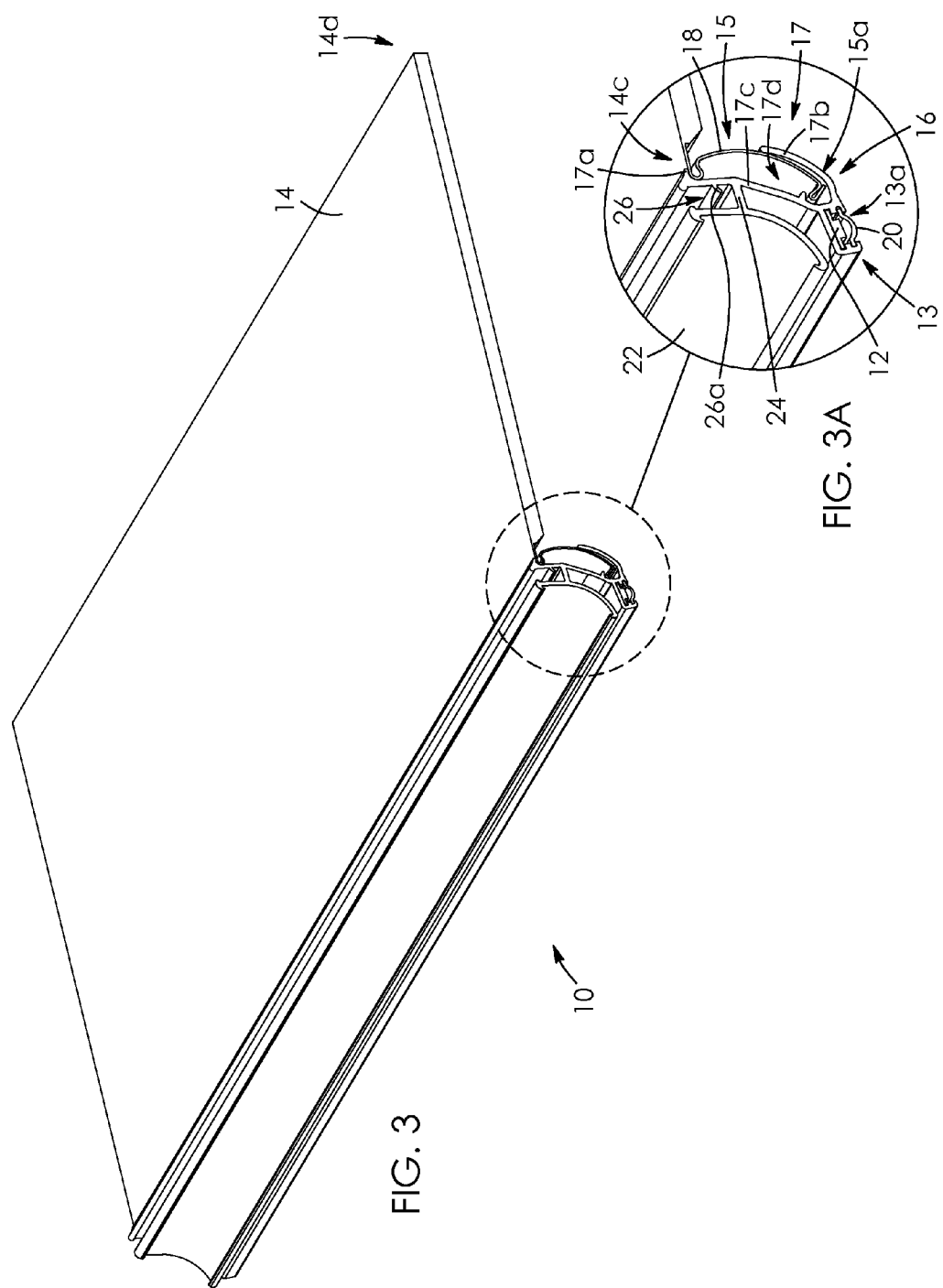
FIG. 3 is a perspective side view of the support for a light source and shown mounted to the shelf of FIG. 1.

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the support for a light source and shelf with a support for a light source and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the support for a light source and shelf with a support for a light source, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Referring generally to FIGS. 1 to 4, in accordance with one embodiment, there is provided a lighting support 10 for a light source 12. The lighting support 10 is operatively connectable to a front edge structure 15 of a shelf 14. In the course of the present description, the front edge structure 15 of the shelf 14 refers to any structure which extends at a front edge of the shelf 14 and is directly connected or indirectly connected to the shelf 14. In the embodiment shown, the front edge structure 15 is a flange 18 projecting from a front end 14c of the shelf 14. However one skilled in the art will understand that, in an alternative embodiment, the front edge structure 15 can be any component connected to the shelf 14 and extending at the front edge, such as, for example and without being limitative, a molding secured to the flange 18.

The lighting support 10 includes a light source support 13 positioned and/or oriented to allow the light source 12 to provide illumination of a section of a lower shelf 14b, i.e. a shelf 14 positioned below an upper shelf 14a which is located above the lower shelf 14b in a shelving and to which the lighting support 10 and the corresponding light source 12 are mounted, and/or items (not shown) located on the lower shelf 14b. In an embodiment, the light source support 13 is positioned and/or oriented such that the section of the lower shelf 14b illuminated by the light source 12 of the lighting support 10 of the upper shelf 14a extends from the front end 14c and the back end 14d of the lower shelf 14b. In an embodiment, the light source support 13 is also positioned and/or oriented such that it allows the light source 12 to illuminate a front section of several consecutive shelves 14 located below.

In order to allow the above described lighting of the lower shelf 14b, in an embodiment, the light source support 13 of the lighting support 10 is positioned at a lower end 10a of the lighting support 10, and projects at least partially forward (or in front) of the front end 14c of the upper shelf 14a, such that at least a section of the light source 12 extends forward of the front end 14c of the upper shelf 14a, when the lighting support 10 is mounted to the upper shelf 14a. In the embodiment shown, the light source support 13 is positioned such that the light source 12 is positioned entirely forward of the front end 14c of the upper shelf 14a, when the lighting support 10 is mounted to the upper shelf 14a. One skilled in the art will however understand that, in an alternative embodiment, the light source support 13 can however be positioned such that a portion of the light source 12 extends forward of the front end 14c of the upper shelf 14a, while other sections of the light source 12 are either vertically substantially aligned with the front end 14c of the upper shelf 14a or extends rearward of the front end 14c of the upper shelf 14a, when the lighting support 10 is mounted thereto.

Moreover, in an embodiment, the light source support 13 of the lighting support 10 is proximal to a lower end 15a of the front edge structure 15 of the upper shelf 14a, when the lighting support 10 is mounted to the shelf 14, in order to avoid blocking access to the items displayed on the lower shelf 14b.

Figure 4:
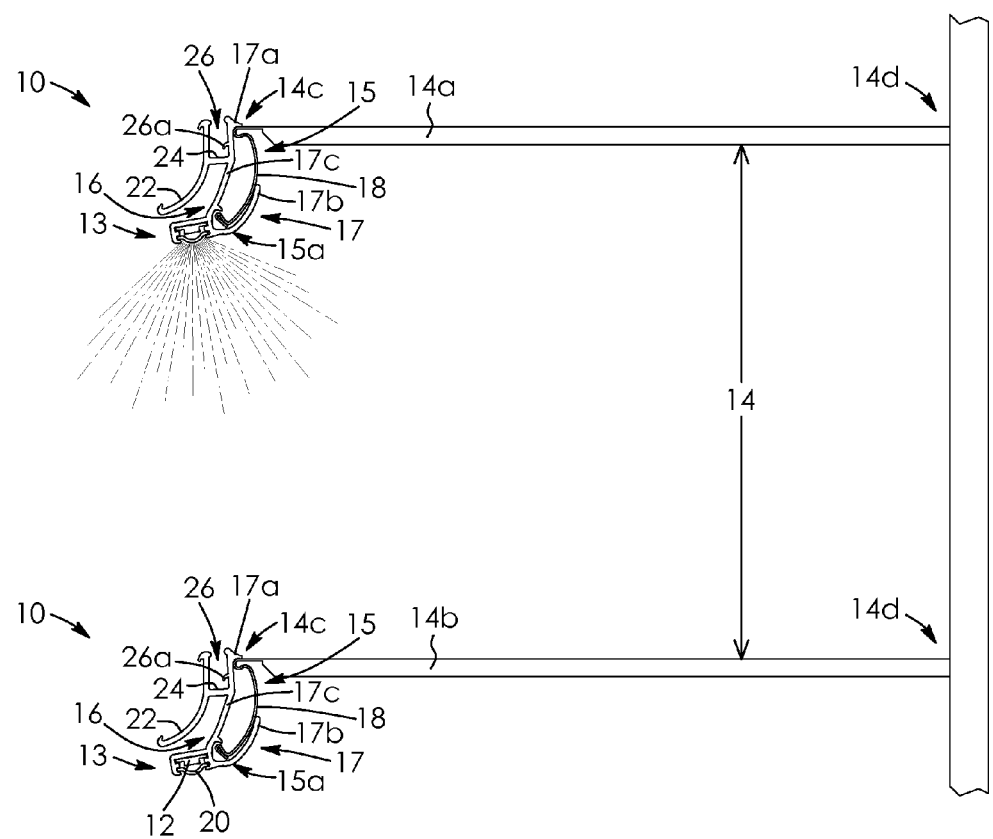
FIG. 4 is a perspective view of shelving with corresponding supports for a light source of FIG. 1.

One skilled in the art will easily understand that even though, only one upper shelf 14a and one lower shelf 14b are shown on the shelving of FIG. 4, in an embodiment, a plurality of shelves 14 can be provided. In such an embodiment, a particular shelf 14 can at the same time be the upper shelf 14a with regards to the lower shelf 14b located below and the lower shelf 14b with regards to the upper shelf 14a located above.

In the embodiment shown in FIGS. 1 to 4, the lighting support 10 forms a price tag molding to be mounted to the flange 18 of the shelf 14. Price tag moldings are common, especially in the retails industry, and are commonly used for mounting a tag, such as a price tag, to the flange 18 of a shelf 14, such as to display various information regarding the products or items placed on the shelf 14. For example and without being limitative, the price tag molding can be made of extruded material such as, without being limitative, plastic, metal, or the like. In an embodiment, the longitudinal dimension of the lighting support 10 corresponds to a width of the shelf 14 on which the lighting support 10 is to be mounted.

One skilled in the art will understand that, in alternative embodiments (not shown), the lighting support 10 can be distinct from a price tag molding. For example and without being limitative, the lighting support 10 can be a standalone component mountable to the flange 18 of the shelf 14, a component connectable to a price tag molding mounted to the flange 18 of a shelf 14, or the like.

In order to allow the lighting support 10 to be directly or indirectly secured to the shelf 14, the lighting support 10 includes a securing member 16 to secure the lighting support 10 to the front edge structure 15 of the shelf 14. In the embodiment shown, the securing member 16 is a clip 17 to be removably secured to the flange 18 of the shelf 14, the flange 18 forming the front edge structure 15 of the shelf 14. The clip 17 includes an upper engaging member 17a and a lower engaging member 17b, joined by a connecting wall 17c and cooperating to secure the lighting support 10 to the flange 18 of the shelf 14. The upper engaging member 17a is positioned at an upper end of the connecting wall 17c and the lower engaging member extends rearwardly and upwardly from a lower end of the connecting wall 17c, thereby defining a flange receiving cavity 17d with the connecting wall 17c. When the clip 17 is clipped onto the front edge structure 15 of the shelf 14, the upper engaging member 17a engages an upper surface of the front end 14c of the shelf 14 and the lower engaging member 17b engages a rear surface of the front edge structure 15 of the shelf 14 at a lower section thereof, with a lower section of the flange 18 being received in the flange receiving cavity 17d. In an embodiment, the components of the clip 17 are made of resilient material, to allow a momentary deformation thereof during engagement/disengagement of the securing member 16 with the shelf 14.

In the embodiment shown, a lip 17e of the upper engaging member 17a is provided to ease the removal of the lighting support 10 from the shelf 14. In an embodiment, the lip 17e also acts as a product stopper, for products located on the shelf 14.

One skilled in the art will also understand that, in an alternative embodiment (not shown), the securing member 16 can be any other type of connector for removably or permanently securing the lighting support 10 to the front edge structure 15 of the shelf 14 by any means or methods, such as, without being limitative, clamping, snapping, press fitting, gluing, or the like. Moreover, in an alternative embodiment, the securing member 16 can be adapted to be secured to a supporting member distinct from the flange 18 which forms the front edge structure 15 of the shelf 14 in the embodiment shown. For example and without being limitative, in an embodiment (not shown), the securing member 16 can be a connector adapted to be secured to the front edge structure 15 embodied by a molding, such as a price tag molding, which is mounted to the flange 18 of the shelf 14, by any means or method, such as, without being limitative, clipping, clamping, snapping, press fitting, gluing, or the like.

The lighting support 10 also includes the light source support 13 which is configured to receive and support the light source 12 therein and which has all of the above-mentioned characteristics. The light source support 13 is connected directly or indirectly to the securing member 16. In an embodiment, the light source support 13 includes a light source receiving cavity 13a sized and shaped to receive the light source 12 therein. In an embodiment, the light source receiving cavity 13a is an elongated cavity to receive an elongated light source 12, such as a led bar including a plurality of successive slim profile LEDs.

In the embodiment shown, the light source receiving cavity 13a also includes an upper elongated groove 13b to support 13 the elongated light source 12 laterally. In the embodiment shown, the light source receiving cavity 13a further includes a lower elongated groove 13c to support an elongated protective lens 20. The protective lens 20 is provided to protect the light source 12 from accidental exterior contacts which may damage the light source 12. In an embodiment, the protective lens 20 can also act as a light diffuser to diffuse the light from the light source 12 and can be clear or frosted.

One skilled in the art will understand that the size and shape of the light source receiving cavity 13a can differ from the embodiment shown. Moreover in an alternative embodiment, the light source receiving cavity 13a could be free of the upper elongated groove 13b and/or the lower elongated groove 13c, the corresponding one of the light source 12 and the protective lens 20 being supported by other means or methods, such as clipping, gluing, press fitting or the like.

In the embodiment shown, the light source support 13 projects from a lower end of the connecting wall 17c of the clip 17 and is positioned at a lower end 10a of the lighting support 10. One skilled in the art will however understand that, in an alternative embodiment, the light source support 13 can project from a different section of the lighting support 10 than the lower end of the connecting wall 17c of the clip 17, as shown. Moreover, in the embodiment shown, the light source support 13 is extruded along with the price tag molding formed by the lighting support 10, such as to be integral therewith. In other words, in the embodiment shown, the light source support 13 is integral to the securing member 16 of the lighting support 10. However, it will once again be understood by one skilled in the art that the light source support 13 can also be a distinct component removably or permanently connected to the lighting support 10 by other means or methods, such as clipping, clamping, snapping, press fitting, gluing or the like.

As mentioned above, the light source support 13 is positioned such as to allow the light source 12 to provide illumination of a section of a lower shelf 14b and, in an embodiment is positioned for at least a section of the light source 12 to extend forward of the front end 14c of the upper shelf 14a, when the lighting support 10 is mounted to the shelf 14. In an embodiment, in order to provide illumination of a section of a lower shelf 14b, the light source support 13 is rearwardly angled from the front end 14c of the shelf 14 and consequently the light source 12 forms a rearward angle from the front end 14c of the shelf 14. For example and without being limitative, in an embodiment the light source support 13 forms a rearward angle of about 10° from the front end 14c of the shelf 14. In an alternative embodiment the light source support 13 forms a rearward angle of between about 1° and about 45° rearward, from the front end 14c of the shelf 14.

As mentioned above, in the embodiment shown, the light source 12 is a led bar including a plurality of successive slim profile low-power LEDs mounted to a printed circuit board. In an alternative embodiment, mid-power LEDs could also be used. The type and quantity of successive LEDs is adapted to the desired luminous flux of the light source 12. In an embodiment, secondary optics could also be provided in combination with the LEDs, to further shape and direct the light as desired. One skilled in the art will also understand that, in alternative embodiments, the light source 12 can be different from the led bar including a plurality of successive LEDs. For example and without being limitative, in an embodiment (not shown) the light source 12 can include a single or a plurality of high-powered or mid-powered light source(s), for example LED(s), incandescent bulb(s), laser(s), or the like, mounted into a fiber optic or light carrying rod.

Still referring to FIGS. 1 to 4, in the embodiment shown, the lighting support 12 also includes a shelf signage bracket 22, positioned forward of the clip 17 and connected to the connecting wall 17c of the clip 17 by a bridge 24. The shelf signage bracket 22 is configured to receive a label (not shown) with information about the product found on the shelf 14 and is oriented such as to allow a proper viewing of the label by the customers.

In the embodiment shown, the lighting support 12 also includes a stopper engaging cavity 26 defined above the bridge 24, between a rear surface of the shelf signage bracket 22 and a front surface of the connecting wall 17c of the clip 17. The stopper engaging cavity 26 is configured to receive a section of an item stopper (not shown), which can be used to prevent merchandise from sliding off the shelf 14, especially in embodiments where the shelf 14 is positioned at an angle from a substantially horizontal position. In an embodiment, the item stopper can be supported by the bridge 24 and can be retained in the stopper engaging cavity 26 by a retaining protrusion 26a, i.e. a protrusion extending into the stopper engaging cavity 26.

One skilled in the art will understand that, in an embodiment, the lighting support 10 can however be free of either one, or both, of the shelf signage bracket 22 and the stopper engaging cavity 26. Moreover, one skilled in the art will understand, that, in alternative embodiments, the size, shape and relative dimensions of the light source support 13, securing member 16, shelf signage bracket 22 and/or stopper engaging cavity 26, can vary from the embodiment shown.

Figure 5:
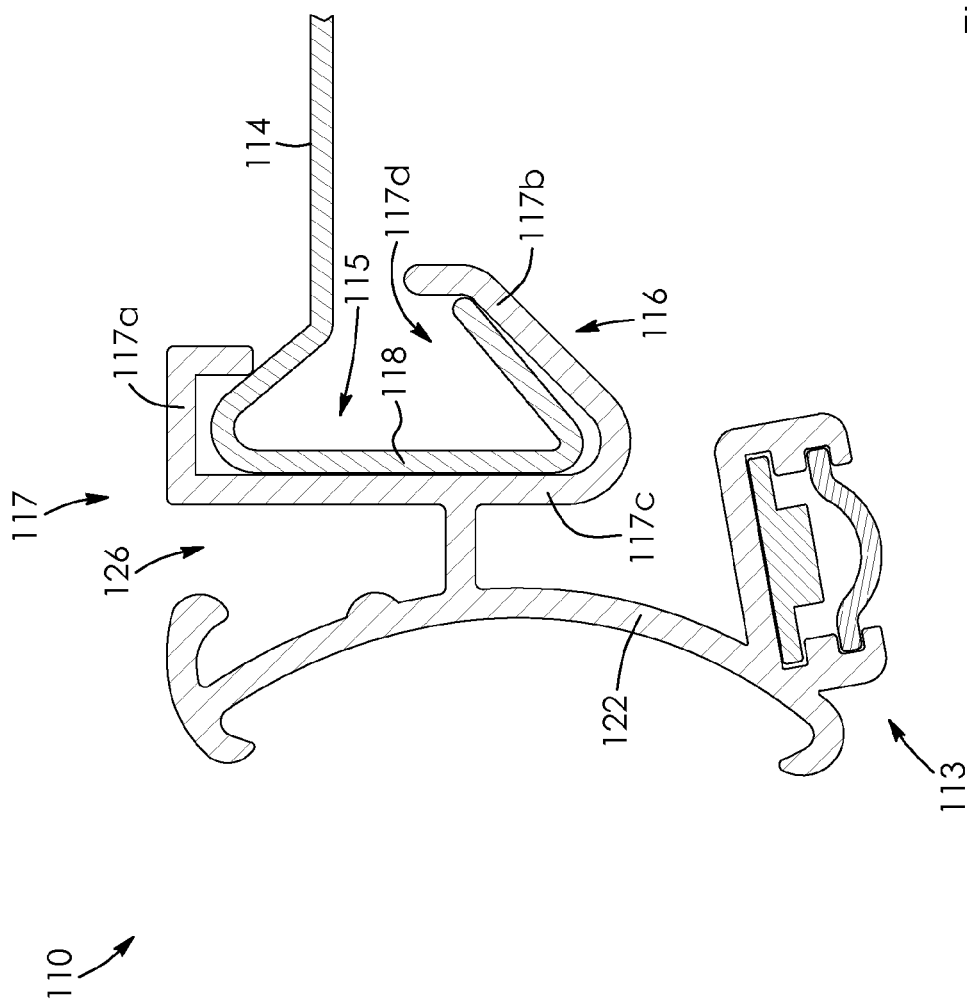
FIG. 5 is a cross sectional side view of a support for a light source according to another embodiment and shown mounted to a shelf.

Now referring to FIG. 5, an alternative embodiment of a lighting support 110, where like features are labeled with reference numbers in the 100 series is shown. The lighting support 110 shown in FIG. 5 includes similar components as the lighting support 10 shown in FIGS. 1 to 4, and also forms a price tag molding to be mounted to the flange 118 of a shelf 114. The lighting support 110 has a light source support 113, a securing member 116, a shelf signage bracket 122 and a stopper engaging cavity 126.

As can be seen, the size and shape of the securing member 116 differs from the embodiment of FIGS. 1 to 4, and is adapted for the lighting support 110 to be secured to the flange 118 of the shelf 114, having its particular size and shape which differs from the size and shape of the flange 18 of the shelf 14 of the embodiment shown in FIGS. 1 to 4. Once again the securing member 116 is a clip 117 to be removably secured to the front edge structure 115 of the shelf 114 and includes an upper engaging member 117a and a lower engaging member 117b, joined by a connecting wall 117c which defines a flange receiving cavity 117d with the lower engaging member 117b.

In the alternative embodiment of FIG. 5, the light source support 113 projects from a lower end of the shelf signage bracket 122, which extends lower than a lower end of the connecting wall 17c of the clip 17, and is integral therewith, rather than projecting from the connecting wall 17c of the clip 17 as in the embodiment of FIGS. 1 to 4. Once again, one skilled in the art will understand that, in an alternative embodiment, the light source support 113 can be a distinct component removably or permanently connected to the lighting support 10 by other means or methods, such as clipping, clamping, snapping, press fitting, gluing or the like.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A lighting support for mounting a light source onto shelving including a lower shelf and an upper shelf, the upper shelf having an item supporting surface, a front end and a front edge structure with a flange extending at least downwardly from the item supporting surface and having an upper end, the lighting support comprising:
 a securing member operatively connectable to the front edge structure of the upper shelf, the securing member comprising a clip defining a flange receiving cavity receiving at least a portion of the flange of the front edge structure therein when the securing member is operatively connected to the front edge structure of the upper shelf;
 a shelf signage bracket connected to the securing member and extending forwardly thereof, the shelf signage bracket being positioned forward of the front edge structure of the upper shelf and being at least partially vertically aligned therewith when the securing member is operatively connected to the front edge structure of the upper shelf; and
 a light source support being supported by at least one of the securing member and the shelf signage bracket, the light source support being positioned below or adjacent to a lower end of the shelf signage bracket and configured to receive and support the light source in a downward and rearward orientation for the light source to illuminate a section of the lower shelf when the securing member is operatively connected to the front edge structure of the upper shelf;
 wherein the lighting support has an upper end positioned below or substantially horizontally levelled with the upper end of the front edge structure to facilitate access to items supported on the supporting surface of the upper shelf.

2. The lighting support of claim 1, wherein the securing member has an upper end and the shelf signage bracket has an upper end and wherein the upper end of each one of the securing member and the shelf signage bracket is below or substantially horizontally levelled with the upper end of the front edge structure to facilitate access to items supported on the supporting surface of the upper shelf.

3. The lighting support of claim 1, wherein the light source support projects at least partially forward of the front end of the upper shelf.

4. The lighting support of claim 1, wherein the light source support projects from the securing member.

5. The lighting support of claim 1, wherein the light source support extends forwardly from a lower end of the securing member.

6. The lighting support of claim 1, wherein the light source support projects from the shelf signage bracket.

7. The lighting support of claim 1, wherein the light source support extends rearwardly from a lower end of the shelf signage bracket.

8. The lighting support of claim 1, further comprising a horizontally-extending bridge connecting the securing member to the shelf signage bracket.

9. The lighting support of claim 1, wherein the light source support is rearwardly angled with regards to the front end of the upper shelf.

10. The lighting support of claim 1, wherein the light source support is proximate to a lower end of the front edge structure of the upper shelf, when the securing member is operatively connected to the front edge structure of the upper shelf.

11. The lighting support of claim 1, wherein the light source support comprises an elongated light source receiving cavity to receive an elongated light source therein.

12. The lighting support of claim 1, wherein the light source support extends below the shelf signage bracket and the securing member.

13. The lighting support of claim 1, wherein the light source support extends substantially between the shelf signage bracket and the securing member.

14. The lighting support of claim 1, in combination with a light source, wherein the light source is an elongated light source including a plurality of successive slim profile LEDs mounted to a printed circuit board.

15. The lighting support of claim 4, wherein the light source support is integral to the securing member.

16. The lighting support of claim 6, wherein the light source support is integral to the shelf signage bracket.

17. The lighting support of claim 8, wherein the light source support extends below the horizontally-extending bridge, is vertically spaced-apart therefrom, and is substantially horizontally aligned therewith.

18. The lighting support of claim 9, wherein a rearward angle of the light source support ranges between about 1° and about 45°.

19. The lighting support of claim 11, wherein the elongated light source receiving cavity is open downwardly and rearwardly.

20. The lighting support of claim 11, wherein the elongated light source receiving cavity extends below and rearwardly of a front end of the shelf signage bracket.

21. A price tag molding for mounting an elongated light source onto a shelf having an item supporting surface, a front end and a front edge structure extending at least downwardly from the item supporting surface and having an upper end, the price tag molding comprising:
  a securing member being connectable to the front edge structure;
  a shelf signage bracket connected to the securing member and extending forwardly of the securing member, the shelf signage bracket extending forwardly of the front end of the shelf, with at least a section thereof being substantially vertically aligned therewith; and
  a light source support being supported by at least one of the shelf signage bracket and the securing member and including an elongated light source receiving cavity extending longitudinally below the shelf signage bracket, the elongated light source receiving cavity being open downwardly and rearwardly and being sized and shaped to receive and support the elongated light source illuminating downwardly and rearwardly of the shelf, the light source support being positioned proximate to a lower end of the front edge structure of the shelf when the securing member is operatively connected to the front edge structure of the shelf;
wherein the price tag molding has an upper end positioned below or substantially horizontally levelled with the upper end of the front edge structure to facilitate access to items supported on the supporting surface of the upper shelf.

22. The price tag molding of claim 21, wherein the securing member has an upper end and the shelf signage bracket has an upper end and wherein the upper end of each one of the securing member and the shelf signage bracket is below or substantially horizontally levelled with the upper end of the front edge structure to facilitate access to items supported on the supporting surface of the upper shelf.

23. The price tag molding of claim 21, wherein the light source support projects at least partially forward of the front end of the shelf.

24. The price tag molding of claim 21, wherein the light source support extends at least partially forward of the securing member.

25. The price tag molding of claim 21, wherein the light source support extends rearwardly from a lower end of the shelf signage bracket.

26. The price tag molding of claim 21, wherein the light source support extends below the shelf signage bracket and the securing member.

27. The price tag molding of claim 21, further comprising a horizontally-extending bridge connecting the securing member to the shelf signage bracket.

28. The price tag molding of claim 21, wherein the light source support is rearwardly angled with regards to the front end of the upper shelf of an angle ranging between about 1° and about 45°.

29. The price tag molding of claim 21, wherein the elongated light source receiving cavity is open downwardly and rearwardly.

30. The price tag molding of claim 21, wherein the elongated light source receiving cavity extends below and rearwardly of a front end of the shelf signage bracket.

31. The price tag molding of claim 21, wherein the light source support extends below the shelf signage bracket and the securing member.

32. The price tag molding of claim 21, wherein the light source support extends substantially between the shelf signage bracket and the securing member.

33. The price tag molding of claim 21, wherein the front edge structure comprises a flange projecting from the front end of the shelf and the securing member comprises a clip defining a flange receiving cavity receiving at least a portion of the flange therein when the securing member is operatively connected to the front edge structure of the shelf.

34. The price tag molding of claim 27, wherein the light source support extends below the horizontally-extending bridge, is vertically spaced-apart therefrom, and is substantially horizontally aligned therewith.

* * * * *